United States Patent
Abbott et al.

(10) Patent No.: US 10,741,293 B2
(45) Date of Patent: Aug. 11, 2020

(54) MOLTEN FUEL REACTOR COOLING AND PUMP CONFIGURATIONS

(71) Applicant: TerraPower, LLC, Bellevue, WA (US)

(72) Inventors: Ryan Abbott, Mountain View, CA (US); Anselmo T. Cisneros, Jr., Seattle, WA (US); Robert A. Corbin, North Bend, WA (US); Daniel Flowers, Bellevue, WA (US); Charles Gregory Freeman, Kirkland, WA (US); Mark A. Havstad, Esparto, CA (US); Christopher J. Johns, Tacoma, WA (US); Brian C. Kelleher, Seattle, WA (US); Kevin Kramer, Redmond, WA (US); Jeffery F. Latkowski, Mercer Island, WA (US); Jon D. McWhirter, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 287 days.

(21) Appl. No.: 15/584,642

(22) Filed: May 2, 2017

(65) Prior Publication Data
US 2017/0316841 A1    Nov. 2, 2017

Related U.S. Application Data

(60) Provisional application No. 62/330,726, filed on May 2, 2016.

(51) Int. Cl.
*G21C 1/32*    (2006.01)
*G21C 15/243*  (2006.01)
(Continued)

(52) U.S. Cl.
CPC ............. *G21C 1/326* (2013.01); *G21C 1/03* (2013.01); *G21C 1/22* (2013.01); *G21C 15/02* (2013.01);
(Continued)

(58) Field of Classification Search
CPC ... G21C 1/02; G21C 1/22; G21C 1/32; G21C 1/326; G21C 15/24; G21C 15/243; G21C 15/247; G21C 15/28
See application file for complete search history.

(56) References Cited

U.S. PATENT DOCUMENTS 2,375,009 A    5/1945  Lepsoe
2,874,106 A    2/1959  Hammond et al.
(Continued)

FOREIGN PATENT DOCUMENTS

CA    631890 A    11/1961
DE    1112791     8/1961
(Continued)

OTHER PUBLICATIONS

Donnelly et al., Fabrication of Heat Exchanger Tube Bundle for the Molten-Salt Reactor Experiment, ORNL-3500, Dec. 9, 1963.
(Continued)

*Primary Examiner* — Sharon M Davis

(57) ABSTRACT

Configurations of molten fuel salt reactors are described that include an auxiliary cooling system which shared part of the primary coolant loop but allows for passive cooling of decay heat from the reactor. Furthermore, different pump configurations for circulating molten fuel through the reactor core and one or more in vessel heat exchangers are described.

18 Claims, 11 Drawing Sheets

(51) Int. Cl.
G21C 1/22 (2006.01)
G21C 1/03 (2006.01)
G21C 15/02 (2006.01)
G21C 15/26 (2006.01)
G21C 11/06 (2006.01)
G21C 1/14 (2006.01)
G21C 3/54 (2006.01)
G21C 15/28 (2006.01)

(52) U.S. Cl.
CPC .............. *G21C 15/243* (2013.01); *G21C 1/14* (2013.01); *G21C 3/54* (2013.01); *G21C 11/06* (2013.01); *G21C 15/26* (2013.01); *G21C 15/28* (2013.01); *Y02E 30/38* (2013.01)

(56) References Cited

U.S. PATENT DOCUMENTS

| | | |
|---|---|---|
| 2,920,024 A | 1/1960 | Barton et al. |
| 2,945,794 A | 7/1960 | Winters et al. |
| 3,018,239 A | 1/1962 | Happell |
| 3,029,130 A | 4/1962 | Moore |
| 3,046,212 A | 7/1962 | Anderson |
| 3,136,700 A | 6/1964 | Poppendiek et al. |
| 3,216,901 A | 11/1965 | Teitel |
| 3,218,160 A | 11/1965 | Knighton et al. |
| 3,262,856 A | 7/1966 | Bettis |
| 3,287,225 A | 11/1966 | Ackroyd et al. |
| 3,383,285 A | 5/1968 | Ackroyd et al. |
| 3,450,198 A | 6/1969 | Brunner |
| 3,785,924 A | 1/1974 | Notari |
| 3,909,351 A | 9/1975 | Tilliette |
| 3,996,099 A | 12/1976 | Faugeras |
| 3,997,413 A | 12/1976 | Fougner |
| 4,039,377 A * | 8/1977 | Andrieu ............... G21C 1/322 376/402 |
| 4,045,286 A * | 8/1977 | Blum .................. G21C 1/03 376/360 |
| 4,056,435 A | 11/1977 | Carlier |
| 4,216,821 A | 8/1980 | Robin |
| 4,342,721 A | 8/1982 | Pomie |
| 4,397,778 A | 8/1983 | Lloyd |
| 4,762,667 A | 8/1988 | Sharbaugh |
| 5,185,120 A | 2/1993 | Fennern |
| 5,196,159 A | 3/1993 | Kawashima |
| 5,223,210 A | 6/1993 | Hunsbedt |
| 5,380,406 A | 1/1995 | Horton |
| 5,421,855 A | 6/1995 | Hayden |
| 6,181,759 B1 | 1/2001 | Heibel |
| 7,217,402 B1 | 5/2007 | Miller |
| 8,416,908 B2 | 4/2013 | Mann |
| 8,594,268 B2 | 11/2013 | Shu |
| 8,734,738 B1 | 5/2014 | Herrmann |
| 9,171,646 B2 | 10/2015 | Moses et al. |
| 10,043,594 B2 | 8/2018 | Scott |
| 10,438,705 B2 | 10/2019 | Cheatham |
| 10,497,479 B2 | 12/2019 | Abbott et al. |
| 2004/0114703 A1 | 6/2004 | Bolton |
| 2005/0220251 A1 | 10/2005 | Yokoyama |
| 2008/0310575 A1 * | 12/2008 | Cinotti .................. G21C 1/00 376/210 |
| 2011/0222642 A1 | 9/2011 | Gautier |
| 2011/0286563 A1 | 11/2011 | Moses |
| 2012/0051481 A1 | 3/2012 | Shu |
| 2012/0056125 A1 | 3/2012 | Raade |
| 2012/0183112 A1 | 7/2012 | Leblanc |
| 2012/0288048 A1 | 11/2012 | Mann |
| 2012/0314829 A1 | 12/2012 | Greene |
| 2013/0083878 A1 | 4/2013 | Massie |
| 2013/0180520 A1 | 7/2013 | Raade |
| 2014/0166924 A1 | 6/2014 | Raade |
| 2014/0348287 A1 | 11/2014 | Huke et al. |
| 2015/0010875 A1 | 1/2015 | Raade |
| 2015/0036779 A1 * | 2/2015 | Leblanc ................. G21C 1/22 376/207 |
| 2015/0078504 A1 | 3/2015 | Woolley |
| 2015/0117589 A1 | 4/2015 | Kamei |
| 2015/0228363 A1 | 8/2015 | Dewan |
| 2015/0243376 A1 | 8/2015 | Wilson |
| 2015/0357056 A1 | 12/2015 | Shayer |
| 2016/0005497 A1 | 1/2016 | Scott |
| 2016/0189806 A1 | 6/2016 | Cheatham, III et al. |
| 2016/0189812 A1 | 6/2016 | Czerwinski |
| 2016/0189813 A1 | 6/2016 | Cisneros |
| 2016/0196885 A1 | 7/2016 | Singh |
| 2016/0217874 A1 | 7/2016 | Dewan |
| 2016/0260509 A1 * | 9/2016 | Kim ...................... G21C 1/322 |
| 2017/0084355 A1 | 3/2017 | Scott |
| 2017/0092381 A1 | 3/2017 | Cisneros |
| 2017/0117065 A1 | 4/2017 | Scott |
| 2017/0301413 A1 | 10/2017 | Cisneros |
| 2017/0301421 A1 | 10/2017 | Abbott |
| 2017/0316840 A1 | 11/2017 | Abbott |
| 2018/0019025 A1 | 1/2018 | Abbott et al. |
| 2018/0047467 A1 | 2/2018 | Czerwinski |
| 2018/0068750 A1 | 3/2018 | Cisneros |
| 2018/0137944 A1 | 5/2018 | Abbott |
| 2019/0237205 A1 | 8/2019 | Abbott |
| 2020/0027590 A1 | 1/2020 | Cisneros |
| 2020/0118698 A1 | 4/2020 | Cheatham |
| 2020/0122109 A1 | 4/2020 | Kruizenga |
| 2020/0185114 A1 | 6/2020 | Abbott |

FOREIGN PATENT DOCUMENTS

| | | |
|---|---|---|
| EP | 0617430 | 9/1994 |
| FR | 2296248 | 7/1976 |
| GB | 739968 | 11/1955 |
| GB | 835266 | 5/1960 |
| GB | 964841 | 7/1964 |
| GB | 2073938 | 10/1981 |
| GB | 2508537 | 12/2014 |
| JP | S571991 | 1/1982 |
| JP | 1991282397 | 12/1991 |
| JP | 2001-133572 | 5/2001 |
| JP | 2014-119429 | 6/2014 |
| RU | 57040 U1 | 9/2006 |
| RU | 2424587 C1 | 7/2011 |
| WO | 2013116942 | 8/2013 |
| WO | WO 2014/0128457 | 8/2014 |
| WO | 2014/196338 | 12/2014 |
| WO | WO 2013/180029 | 5/2015 |
| WO | WO 2014/074930 | 5/2015 |
| WO | WO 2015/140495 | 9/2015 |
| WO | WO 2016/109565 | 7/2016 |
| WO | WO 2018013317 | 1/2018 |

OTHER PUBLICATIONS

Mourogov et al., Potentialities of the fast spectrum molten salt reactor concept: REBUS-3700, Energy Conversion and Management 47 (2006) 2761-2771.
PCT/US17/30455 International Search Report and Written Opinion dated Jan. 2, 2018, 27 pages.
PCT/US17/30457 International Search Report and Written Opinion dated Jan. 23, 2018, 24 pages.
PCT/US17/30455 International Preliminary Report on Patentability dated Nov. 15, 2018, 18 pages.
PCT/US17/30457 International Preliminary Report on Patentability dated Nov. 15, 2018, 16 pages.
Clarno, K.T. et al., "Trade studies for the liquid-salt-cooled very high-temperature reactor fiscal year 2006 progress report", ORNL/TM-2006 140 (2007), 35 pgs.
Kimura, "Neutron spectrum in small iron pile surrounded by lead reflector", Journal of Nucear Science and Technology 15, No. 3 (1978): 183-191.
Abbott et al, Thermal and Mechanical Design Aspects of the Life Engine, Fusion Science and Technology Dec. 2008; 56(2), 7 pages.
Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.

(56) References Cited

OTHER PUBLICATIONS

ASTM International, Designation: B898-11, Standard Specification for Reactive and Refractory Metal Clad Plate (Sep. 2011), 15 pages.
Cohen et al., "Vanadium-Lined HT9 Cladding Tubes", Argonne National Lab ANL/ET/CP-80384, (Feb. 1994), 12 pgs.
European Extended Search Report for EP 15876187.4 dated Sep. 11, 2018, 10 pages.
Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.
Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.
Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.
Freeman et al., "Archimedes Plasma Mass Filter", AIP Cont. Proc. 694, 403 (2003), 9 pages.
Gen IV International Forum, Molten Salt Reactor (MSR), https://www.gen-4.org/gif/jcms/c_9359/msr, accessed Feb. 26, 2016, 3 pgs.
Grimes, W.R., "Molten-Salt Reactor Chemistry" Nucl. Appl. Technol. 8(137) (1970), 19 pgs.
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, Aug. 1969.
Holcomb, et al. "Fast Spectrum Molten Salt Reactor Options", Jul. 2011, 46 pages. Available at: http://info.ornl.gov/sites/publications/files/Pub29596.pdf.
Kramer et al., Fusion-Fission Blanket Options for the LIFE Engine, Fusion Science and Technology, vol. 60, pp. 72-77, Jul. 2011.
Kramer et al., Parameter study of the LIFE engine nuclear design, Energy Conversion and Management, 51, pp. 1744-1750, 2010.
Merle-Lucotte, E., Introduction to the Physics of the Molten Salt Fast Reactor, Thorium Energy Conference 2013 (ThEC13), 2013, 82 pgs.
Molten Salt Reactor (MSR) Review: Feasibility Study of developing a pilot scale molten salt reactor in the UK, Jul. 2015, Energy Process Developments, LTD., www.energyprocessdevelopments.com, 75 pgs.
MSR-FUJI General Information, Technical Features, and Operating Characteristics., pp. 1-30.
Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982, 310 pgs.
Ottewitte, E. H., Cursory First Look at the Molten Chloride Fast Reactor as an Alternative to the Conventional BATR Concept, 1992, 75 pgs.
PCT International Preliminary Report on Patentability in International Application PCT/US2016/055001, dated Apr. 12, 2018, 9 pages.
PCT International Preliminary Report on Patentability in International Application PCT/US2017/030666 dated Nov. 6, 2018, 9 pages.
PCT International Search Report and Written Opinion in International Application No. PCT/US2017/030672, dated Sep. 27, 2017, 9 pages.
PCT International Search Report and Written Opinion in International Application PCT/US2015/067905 dated Aug. 5, 2016, 18 pages.
PCT International Search Report and Written Opinion in International Application PCT/US2015/067923, dated Apr. 19, 2016, 10 pages.
PCT International Search Report and Written Opinion in International Application PCT/US2016/055001, dated Jan. 25, 2017, 11 pages.
PCT International Search Report and Written Opinion in International Application PCT/US2017/030666 dated Jul. 20, 2017, 11 pages.
Reactor Start-up Procedure. Technical University Dresden. Reactor Training Course. pp. 3-4. <https://tu-dresden.de/ing/maschinenwesen/iet/wket/ressourcen/dateien/akr2/Lehrrnaterialien/start_e.pdf?lang=en>. (Mar. 2015), 21 pgs.
Scott, Ian and Durham John, The Simple Molten Salt Reactor, Practical, safe and cheap, Moltex Energy LLP presentation slides, 19 pgs.
Scott, Ian, Safer, cheaper nuclear: The simple molten salt reactor (Dec 2, 2014), http://www.ee.co.za/article/safer-cheaper-nuclear-simple-molten-salt-reactor.hlml, 10 pgs.
Taube, et al., Molten Plutonium Chlorides Fast Breeder Reactor Cooled by Molten Uranium Chloride, Annals of Nuclear Science and Engineering, vol. 1, pp. 277-281., 1974.
Thoma, R. E., "Chemical Aspects of MSRE Operations," ORNL-4658, Dec. 1971, 151 pages.
TransAtomic Power Technical White Paper, Mar. 2014, V1 .0.1., (2014), http://www.transatomicpower.com/, 34 pgs.
Van't Eind, R.J.S., Simulation of a Fast Molten Salt Reactor, PSR-131-2011-009, Jul. 2011, 68 pages.
Xu et al., Thorium Energy R&D in China, THEO13, CERN, Oct. 28, 2013, 59 pgs.
PCT International Search Report and Written Opinion in International Application PCT/US2017/038806, dated Oct. 16, 2017, 13 pgs.
PCT International Preliminary Report on Patentability in International Application PCT/US2017/038806, dated Jan. 15, 2019, 7 pgs.
Maltsev et al., "Redox potentials of uranium in molten eutectic mixture of lithium, potassium, and cesium chlorides", Russian Metallurgy, Maiknauka- Interperidica, RU, vol. 2016, No. 8, Dec. 2016, 2 pgs.
Kuznetsov et al., "Electrochemical Behavior and Some Thermodynamic Properties of UC1 [sub 4] and UC1 [sub 3] Dissolved in a LiC1-KC1 Eutectic Melt", Journal of the Electrochemical Society, vol. 152, No. 4, Jan. 2005, 11 pgs.
PCT International Search Report and Written Opinion in International Application PCT/US2017/046139, dated Jan. 17, 2018, 16 pages.
PCT International Preliminary Report on Patentability in International Application PCT/US2017/046139, dated Feb. 12, 2019, 8 pages.
PCT International Search Report and Written Opinion in International Application PCT/US2017/061843, dated Oct. 29, 2018, 23 pages.
PCT International Preliminary Report on Patentability in International Application PCT/US2017/061843, dated May 21, 2019, 13 pages.
PCT International Search Report and Written Opinion in International Application PCT/US2019/015967, dated Jun. 12, 2019, 25 pages.
PCT International Search Report and Written Opinion in International Application PCT/US2019/021791, dated Nov. 19, 2019, 15 pages.
PCT International Search Report and Written Opinion in International Application PCT/US2019/051345, dated Mar. 5, 2020, 15 pages.
Wang, Jun-Wei et al., "Influence of MgC12content on corrosion behavior of GH1140 in molten naCl-MgC12as thermal storage medium", Solar Energy Materials and Solar Cells, Elsevier Science Pub., Amsterdam, NL, vol. 179, Nov. 20, 2017, pp. 194-201.

\* cited by examiner

MOLTEN FUEL REACTOR COOLING AND PUMP CONFIGURATIONS

RELATED APPLICATIONS

This application claims the benefit of U.S. Provisional Application No. 62/330,726, filed May 2, 2016, which application is hereby incorporated by reference.

INTRODUCTION

The utilization of molten fuels in a nuclear reactor to produce power provides significant advantages as compared to solid fuels. For instance, molten fuel reactors generally provide higher power densities compared to solid fuel reactors, while at the same time having reduced fuel costs due to the relatively high cost of solid fuel fabrication.

Molten fluoride fuel salts suitable for use in nuclear reactors have been developed using uranium tetrafluoride ($UF_4$) mixed with other fluoride salts such as $UF_6$, and $UF_3$. Molten fluoride salt reactors have been operated at average temperatures between 600° C. and 860° C. Binary, ternary, and quaternary chloride fuel salts of uranium, as well as other fissionable elements, have been described in co-assigned U.S. patent application Ser. No. 14/981,512, titled MOLTEN NUCLEAR FUEL SALTS AND RELATED SYSTEMS AND METHODS, which application is hereby incorporated herein by reference. In addition to chloride fuel salts containing one or more of $PuCl_3$, $UCl_4$, $UCl_3F$, $UCl_3$, $UCl_2F_2$, and $UClF_3$, the application further discloses fuel salts with modified amounts of $^{37}Cl$, bromide fuel salts such as $UBr_3$ or $UBr_4$, thorium chloride (e.g., $ThCl_4$) fuel salts, and methods and systems for using the fuel salts in a molten fuel reactor. Average operating temperatures of chloride salt reactors are anticipated between 300° C. and 600° C., but could be even higher, e.g., >1000° C.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

This disclosure describes various configurations and components of a molten fuel nuclear reactor. For the purposes of this application, embodiments of a molten fuel reactor that use a chloride fuel, such as a mixture of one or more fuel salts such as $PuCl_3$, $UCl_3$, and/or $UCl_4$ and one or more non-fissile salts such as NaCl and/or $MgCl_2$, will be described. However, it will be understood that any type of fuel salt, now known or later developed, may be used and that the technologies described herein may be equally applicable regardless of the type of fuel used. For example, a fuel salt may include one or more non-fissile salts such as, but not limited to, NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$. Note that the minimum and maximum operational temperatures of fuel within a reactor may vary depending on the fuel salt used in order to maintain the salt within the liquid phase throughout the reactor. Minimum temperatures may be as low as 300-350° C. and maximum temperatures may be as high as 1400° C. or higher. Similarly, except were explicitly discussed otherwise, heat exchangers will be generally presented in this disclosure in terms of simple, single pass, shell-and-tube heat exchangers having a set of tubes and with tube sheets at either end within a shell. However, it will be understood that, in general, any design of heat exchanger may be used, although some designs may be more suitable than others. For example, in addition to shell and tube heat exchangers, plate, plate and shell, printed circuit, and plate fin heat exchangers may be suitable.

Figure 1:
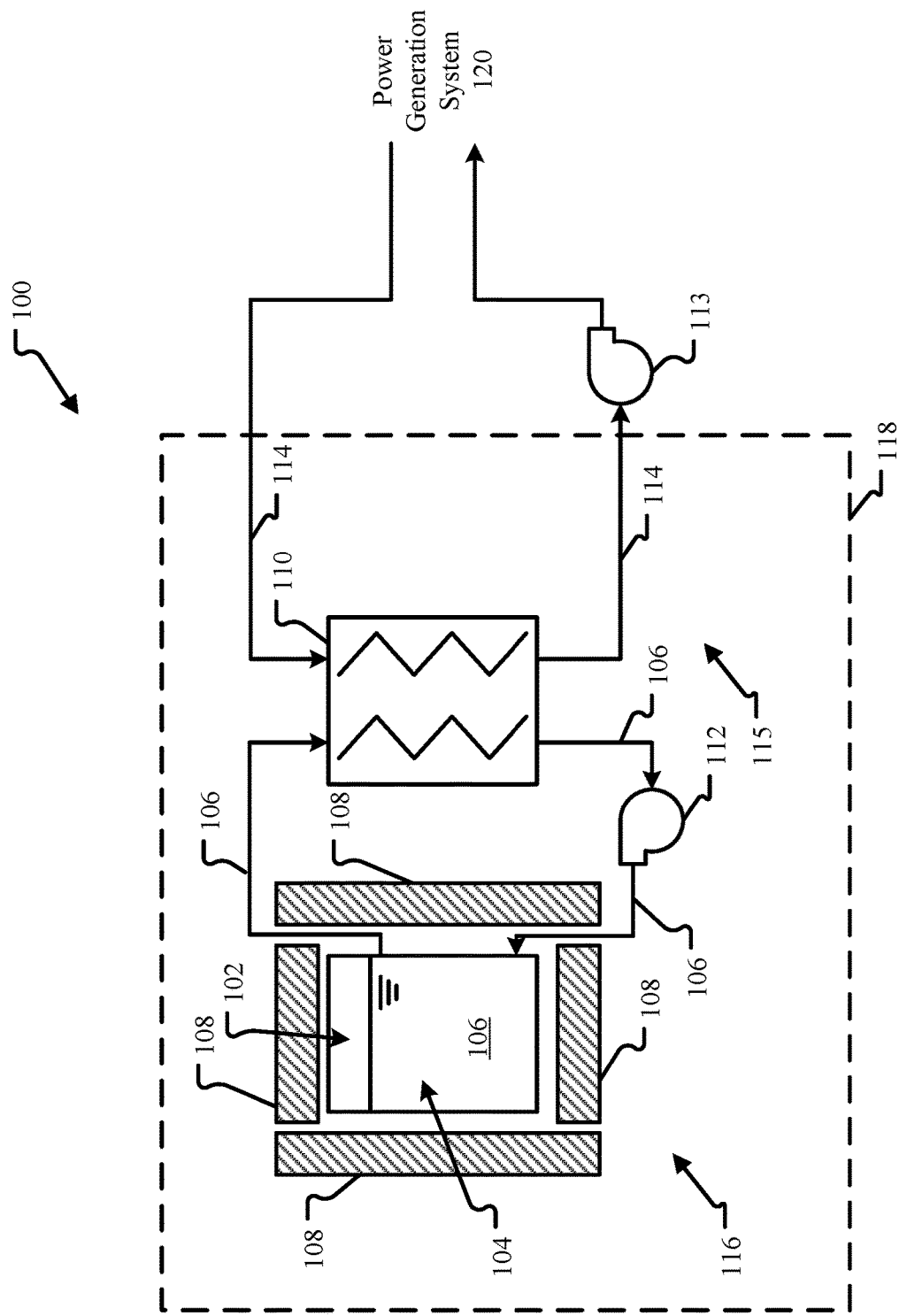
FIG. 1 illustrates, in a block diagram form, some of the basic components of a molten fuel reactor.

FIG. 1 illustrates, in a block diagram form, some of the basic components of a molten fuel reactor. In general, a molten fuel reactor 100 includes a reactor core 104 containing a fissionable fuel salt 106 that is liquid at the operating temperature. Fissionable fuel salts include salts of any nuclide capable of undergoing fission when exposed to low-energy thermal neutrons or high-energy neutrons. Furthermore, for the purposes of this disclosure, fissionable material includes any fissile material, any fertile material or combination of fissile and fertile materials. The fuel salt 106 may or may not completely fill the core 104, and the embodiment shown is illustrated with an optional headspace 102 above the level of the fuel salt 106 in the core 104. The size of the reactor core 104 may be selected based on the characteristics and type of the particular fuel salt 106 being used in order to achieve and maintain the fuel in an ongoing state of criticality, during which the heat generated by the ongoing production of neutrons in the fuel causes the temperature of the molten fuel to rise when it is in the reactor core. Criticality refers to a state in which loss rate of neutrons is equal to or less than the production rate of neutrons in the reactor core. The performance of the reactor 100 is improved by providing one or more reflectors 108A, 108B, 108C around the core 104 to reflect neutrons back into the core. Reflectors may be made of any neutron reflecting material, now known or later developed, such as graphite, beryllium, steel, or tungsten carbide. The molten fuel salt 106 is circulated between the reactor core 104 and one or more primary heat exchangers 110 located outside of the core 104. The circulation may be driven using one or more pumps 112.

The primary heat exchangers 110 transfer heat from the molten fuel salt 106 to a primary coolant 114 that is circulated through a primary coolant loop 115. In an embodiment the primary coolant may be another salt, such as NaCl—$MgCl_2$, or lead. For example, in an embodiment, the primary coolant is 42$MgCl_2$+58NaCl salt. Other coolants are also possible including Na, NaK, supercritical $CO_2$ and lead bismuth eutectic. In an embodiment, a reflector 108 is between each primary heat exchanger 110 and the reactor core 104 as shown in FIG. 1. For example, in an embodiment a cylindrical reactor core 104, having a diameter of 2 meters (m) and a height of 3 m, is oriented vertically so that the flat ends of the cylinder are on the top and bottom respectively. The entire reactor core 104 is completely encased in reflectors 108 between which are provided channels for the flow of fuel salt 106 into and out of the reactor core 104.

Although FIG. 1 illustrates one heat exchanger 110, depending on the embodiment any number of heat exchangers 110 may be used, the heat exchangers 110 being spaced around the exterior of the core 104. For example, embodiments having two, four, six, eight, ten, twelve and sixteen primary heat exchangers are contemplated.

As discussed above, any design of heat exchanger may be used but, generally, the heat exchangers 110 will be discussed in terms of a shell and tube heat exchanger. In shell and tube heat exchanger embodiments, the fuel salt may flow through the tubes which are contained within a shell filled with the primary coolant. The fuel salt enters the tubes via one or more tube sheets in the shell to prevent the fuel salt from mixing with the primary coolant. This is referred to as either a tube-side fuel or a shell-side coolant configuration. Alternatively, the fuel salt may flow through the shell and the primary coolant may flow through the tubes, which is referred to either as a tube-side coolant or shell-side fuel configuration.

Salt contacting surfaces of heat exchanger components may be clad to protect against corrosion. Other protection options include protective coatings, loose fitting liners or press-fit liners. In an embodiment, cladding on the internal surface of the tubes is molybdenum that is co-extruded with the base heat exchanger tube material. For other fuel salt contacting surfaces (exterior surfaces of the tube sheets and exterior surface of the shell), the cladding material is molybdenum alloy. Nickel and nickel alloys are other possible cladding materials. Molybdenum-rhenium alloys may be used where welding is required. Components in contact with primary cooling salt may be clad with Alloy 200 or any other compatible metals, such as materials meeting the American Society of Mechanical Engineers' pressure vessel code. The tube primary material may be 316 stainless steel or any other compatible metals. For example, in an embodiment alloy 617 is the shell and tube sheet material.

In a tube-side fuel embodiment the fuel salt flows through the tubes of the heat exchanger 110 and exits into the fuel salt outlet channel. The primary coolant within the shell of the heat exchanger 110 removes heat from the fuel salt traveling through the tubes and heated coolant is then passed to the power generation system 120.

As shown in FIG. 1, heated primary coolant 114 from the primary heat exchangers 110 is passed to a power generation system 120 for the generation of some form of power, e.g., thermal, electrical, or mechanical. The reactor core 104, primary heat exchangers 110, pumps 112, molten fuel circulation piping (including other ancillary components that are not shown such as check valves, shutoff valves, flanges, drain tanks, etc.) and any other components through which the molten fuel circulates during operation can be referred to as the fuel loop 116. Likewise, the primary coolant loop 115 includes those components through which primary coolant circulates, including the primary heat exchangers 110, primary coolant circulation piping (including other ancillary components that are not shown such as coolant pumps 113, check valves, shutoff valves, flanges, drain tanks, etc.).

The molten fuel reactor 100 further includes at least one containment vessel 118 that contains the fuel loop 116 to prevent a release of molten fuel salt 106 in case there is a leak from one of the fuel loop components. Note that not all of the primary coolant loop 115 is within the containment vessel 118.

In an embodiment fuel salt flow is driven by a pump 112 so that the fuel salt circulates through the fuel loop 116. In the embodiment shown, there is one pump 112 for each primary heat exchanger 110. Fewer or more pumps may be used. For example, in alternative embodiments multiple, smaller pumps may be used for each heat exchanger 110. In an embodiment, a pump 112 may include an impeller at some location within the fuel loop 116. In an embodiment, the channel or component of the fuel loop containing the impeller also serves as the pump casing or body, so that rotation of the impeller drives the flow of fuel salt around the fuel loop. Impellers may be of any design such as open, semi-open or closed and the impeller blades may be any configuration such as backward-curved, forward-curved or radial. One or more diffuser vanes may also be provided at or near an impeller location to assist in directing the flow driven by the rotation of the impeller. The impeller may be attached to a rotating shaft that connects the impeller to a motor which may be located outside of the fuel loop and containment vessel. An example of this embodiment can be found in FIGS. 6A-6C, discussed below. Other pump configurations are also possible.

Broadly speaking, this disclosure describes multiple alterations and component configurations that improve the performance of the reactor 100 described with reference to FIG. 1.

Auxiliary Cooling System (ACS)

In an embodiment, an ACS may be provided for auxiliary cooling of the primary coolant. The ACS may share some components of the primary coolant loop and be designed to take over cooling during certain events or under certain circumstances. In an embodiment, the ACS may be composed of one or more independent ACS loops (i.e., independent from the other ACS loops) in which each ACS loop shares some of its flow path with a primary coolant loop.

The major components that together constitute the ACS are: pipes such as 316 stainless steel pipes with nickel cladding; containment isolation valves; auxiliary heat exchangers; air ducts; support structures; and instrumentation and diagnostics.

Figure 2A:
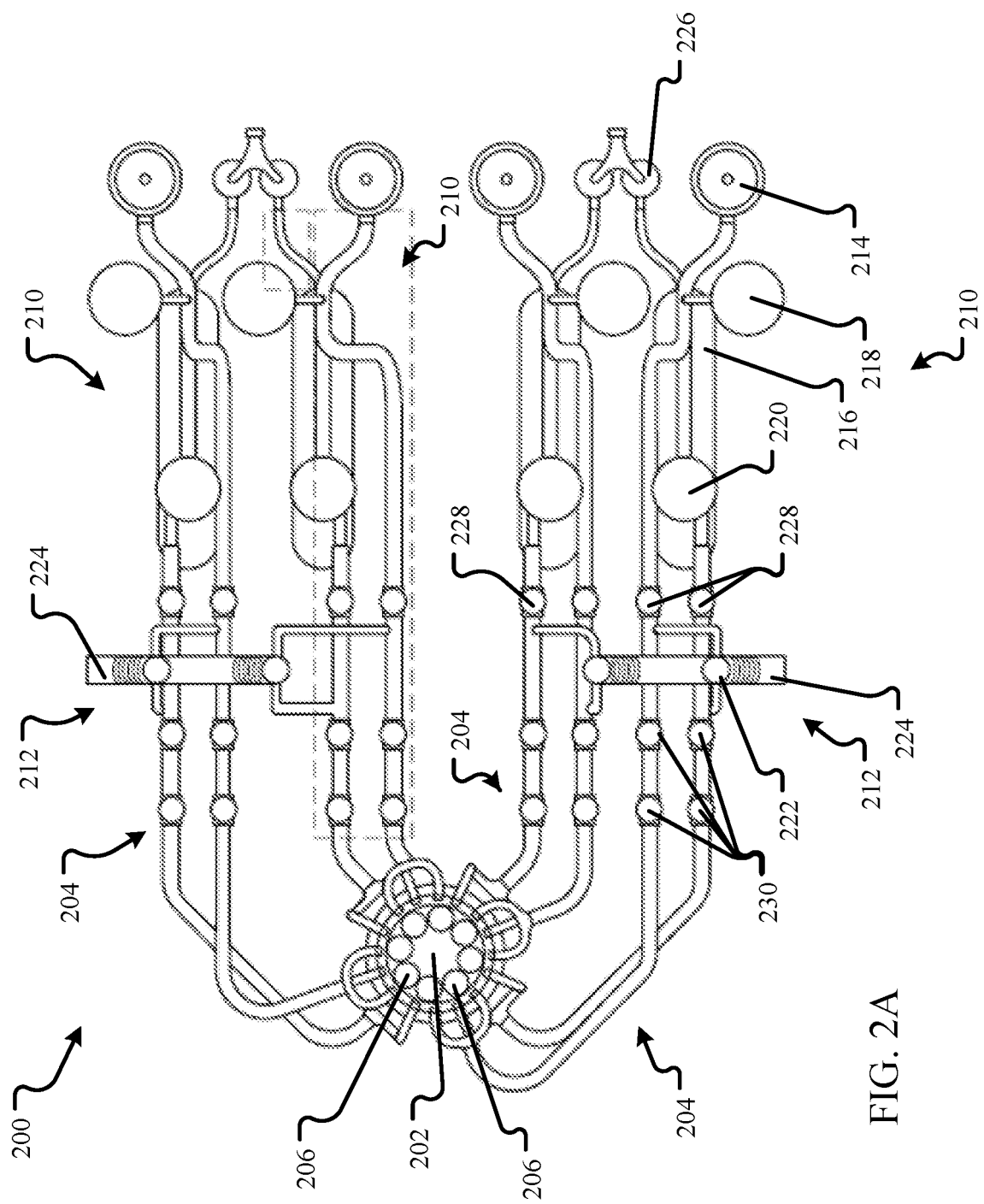
FIGS. 2A and 2B illustrate an embodiment of a layout of the primary cooling loop and the Auxiliary Cooling System (ACS).
Figure 2B:
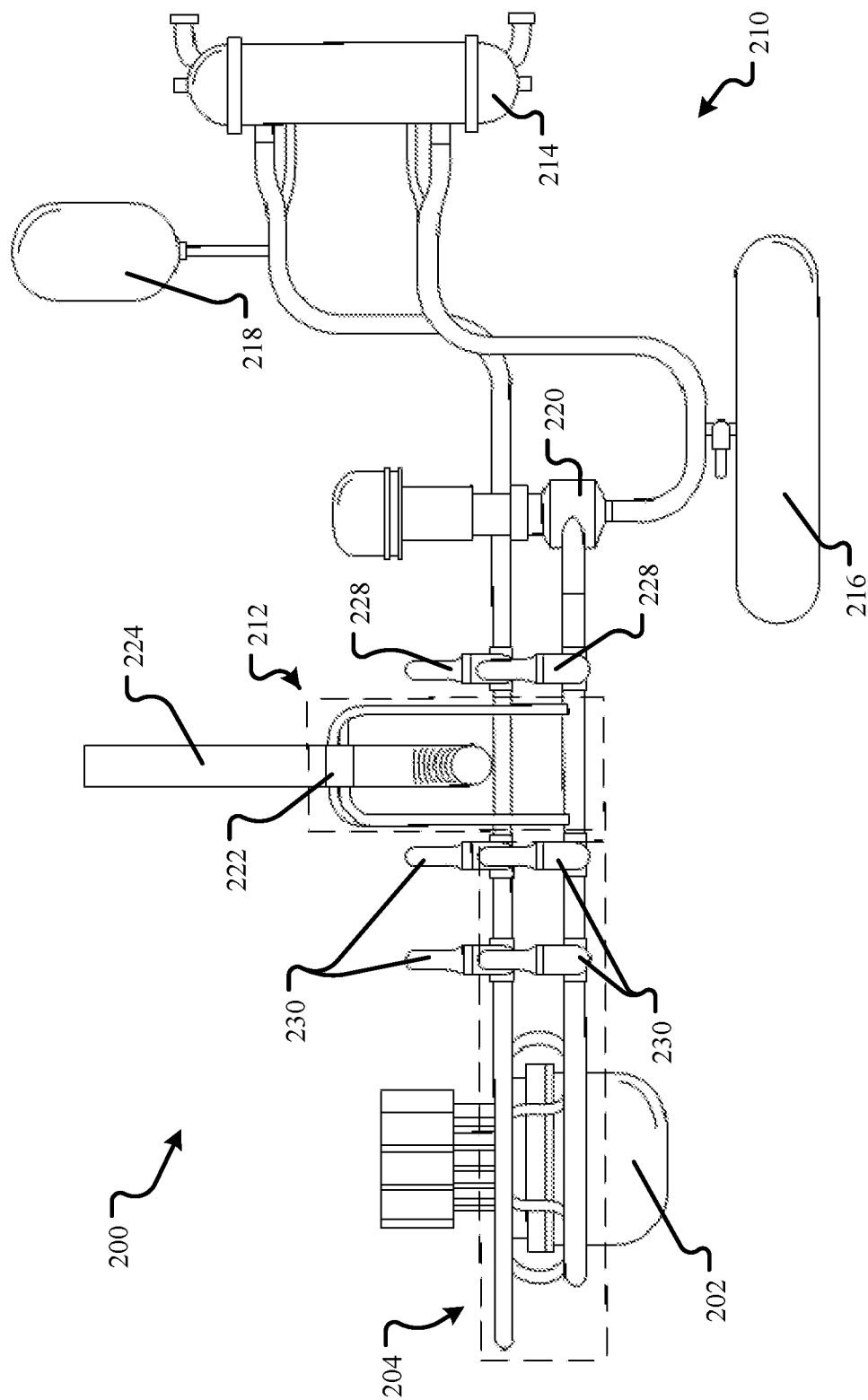

FIGS. 2A and 2B illustrate an embodiment of a layout of the primary cooling loop and the ACS adapted for use in a molten fuel nuclear reactor. In the embodiment shown, a molten fuel reactor 202 is shown connected to four primary coolant circuits. The auxiliary cooling system is integrated into the four independent parallel primary coolant circuits. Each circuit includes a primary cooling leg 210 and an ACS leg 212 and a shared reactor coolant inlet and outlet portion 204 that pipes the primary coolant into and out of the reactor 202. Because it is shared, the reactor inlet and outlet portion 204 is considered part of both the primary coolant loop and the ACS loop.

The primary cooling loop has the function of transporting thermal energy from the primary heat exchangers 206 inside the reactor 202, which may be within the reactor's containment vessel, to the power generation system (not shown) during normal operation. The primary cooling loop is made up of the reactor inlet and outlet portion 204 and the primary cooling leg 210. In the embodiment shown, the primary cooling legs 210 include the heat exchangers 206 and coolant management equipment needed to maintain the normal cooling operation for the reactor 202. In the embodiment shown, each primary cooling leg 210 includes, among other things, two heat exchangers 206, a coolant pump 220, a power recovery system in the form of a steam generator 214, a drain tank 216, and a coolant makeup tank 218. A steam reheater 226 may also be provided. The power recovery system converts the thermal energy from the heated primary coolant into electrical, thermal or mechanical power. Many types of power recovery systems are known and any system, now known or later developed, may be used.

In the specific embodiment shown, the steam generator 214 transfers energy from the heated primary coolant to a water stream to generate steam from which electrical, thermal or mechanical power is generated, for example, by using the steam to run a steam turbine cycle to generate electricity. The drain tank 216 is provided at a low spot in the circuit piping to allow the salt to be drained from the circuit to allow for servicing, repair, or replacement of components in the circuit. The makeup tank 218 serves as an expansion chamber and contains extra coolant to maintain the desired level and pressure of the coolant in the circuit throughout the operational temperature range even though the volume of the primary coolant may fluctuate over that temperature range.

The ACS loop has the function of transporting thermal energy from the primary heat exchangers to atmospheric air in some non-normal operating scenarios via entirely passive physical processes. In the embodiment shown, the ACS loop is made up of the reactor inlet and outlet portion 204 and the ACS leg 212. The ACS leg 212 includes an auxiliary heat exchanger (AHX) 222 and an air duct 224. The air duct 224 permits the flow of cool ambient air to the AHX 222 and vents heated air to the atmosphere in order to remove heat from the primary coolant flowing in the ACS loop. The AHX 222 is placed to generate buoyancy-driven natural circulation of coolant salt when the ACS is active. As mentioned above, the AHX 222 may be any suitable air-cooled heat exchanger design including, but not limited to, a fin, a fin fan heat exchanger, a plate and shell, or a shell and tube heat exchanger.

In an embodiment, the ACS 200 may be bypassed during normal reactor operation so that as much of the heat generated by the reactor 202 as possible is available for generating power. In an alternative embodiment, the ACS 200 may be in continuous use regardless of the reactor's operating condition. In yet another embodiment, the circuits may be designed in such a way that the ACS 200 has only a reduced flow of primary coolant or otherwise causes a reduced amount of heat transfer to the air during normal operation, but a larger flow and/or heat transfer during non-normal operation. For example, in an embodiment during a loss of power, the air duct 224 may automatically open or may open more fully to increase the air flow through the AHX 222.

As mentioned above, in an embodiment the ACS 200 may be designed to be entirely passive in operation. That is, the cooling provided by the ACS 200 occurs in the absence of externally provided power or control. In such a design, during a loss of forced flow event the primary coolant flow may be driven by the heat generated by the reactor 220, such as the decay heat generated by the fuel salt in the reactor when the reactor is subcritical. In addition, in an embodiment the cooling circuits 202 may be designed so that in the event of a loss of power flow is directed from the primary loop to the ACS loop. For example, valves between the reactor inlet and outlet portion 204 and the primary cooling leg 210 may be automatically closed in the event of a loss of power forcing the coolant flow through the ACS loop. In the embodiment shown, check valves 228 are provided that prevent flow from the ACS loop from circulating into the primary cooling leg 210.

Note that even though the ACS 200 may be able to operate completely passively in an emergency, in a non-emergency the ACS 200 may also be controllable to augment or take over cooling duties from the primary coolant loop 206 when desired. Such may occur at times when the power generation is not needed or desired, but the operator still has need to operate the reactor 202, such as during startup, shutdown, periods of low power demand, or testing. As such, the ACS 200 can provide both flexibility in operation while serving as the emergency heat removal system.

In an embodiment, the primary coolant is a molten salt, such as $42MgCl_2+58NaCl$, and all salt-facing surfaces are made of or coated with material suitable for use as the coolant salt. For example, the pipes may be 316 stainless steel with a nickel cladding on their interior surfaces and have a trace heating system used during startup to melt frozen salt. In an embodiment, check valves may be provided to control flow of coolant into the reactor 202 when the ACS 200 activates to avoid overcooling the fuel. Isolation valves 230 may be provided to serve as part of the containment boundary for non-normal operating scenarios.

The embodiment illustrated in FIGS. 2A and 2B makes use of four independent ACS loops. The ACS loops may be sized for redundancy so that if any one of them fails, the system still provides sufficient cooling to keep all structures, systems, and components within design limits.

Direct Reactor Auxiliary Cooling System (DRACS)

As discussed above, in the event of a power failure, natural circulation of the fuel salt through the primary heat exchanger can prevent buildup of too much thermal energy in the fuel salt. However, a direct reactor auxiliary cooling system (DRACS) may also be provided. In an embodiment, during a power failure the DRACS may be responsible for removing a sufficient amount of thermal energy from the reactor to prevent damage to any of the components. A DRACS may include one or more dedicated secondary heat exchangers that transfer thermal energy from the fuel salt to the primary coolant and, subsequently, the atmosphere via the ACS. Examples of such DRACS heat exchanger designs can be found in U.S. Provisional Patent Application Ser. No. 62/422,474, filed Nov. 15, 2016, titled THERMAL MANAGEMENT OF MOLTEN FUEL NUCLEAR REACTORS, which application is hereby incorporated herein by reference.

In an embodiment, the DRACS system has a dedicated DRACS heat exchanger in the reactor pool in addition to any primary heat exchangers. The DRACS may also include a dedicated DRACS coolant loop completely independent from the primary coolant loop. In an embodiment, the DRACS may be sized to be capable of removing the expected decay heat from the reactor in the event that the primary coolant loop has become completely inoperative. Embodiments of the reactors described herein may provide one or more DRACS heat exchangers in addition to the primary heat exchangers. The DRACS heat exchangers may be located at a level higher than the thermal center of the reactor core and the primary heat exchanger, in order to take greater advantage of the natural circulation which is more important during a loss of forced flow event. For example, in an embodiment a DRACS heat exchanger is provided above the primary heat exchanger in the flow of fuel salt. Separate DRACS heat exchangers may or may not be used during normal operation to provide cooling.

In an alternative embodiment, the upper reflector may incorporate a DRACS heat exchanger. In this embodiment, the DRACS heat exchanger may be contained within the upper reflector. This may use a coolant that also serves as a reflector or neutron absorber, as described in greater detail in U.S. patent application Ser. No. 15/282,814, filed Sep. 30, 2016, titled NEUTRON REFLECTOR ASSEMBLY FOR DYNAMIC SPECTRUM SHIFTING. In an embodiment, the coolant may be solid at operating temperatures but, upon the top of the reactor core reaching some higher temperature, the coolant may melt at which point the DRACS may begin operation. For example, lead and alloys of lead such as lead-bismuth alloy (e.g., lead-bismuth eutectic 44.5Pb-55.5Bi) and lead-copper alloy (e.g., molybdockalkos) may be used.

Molten Fuel Pump Configurations

Figure 3A:
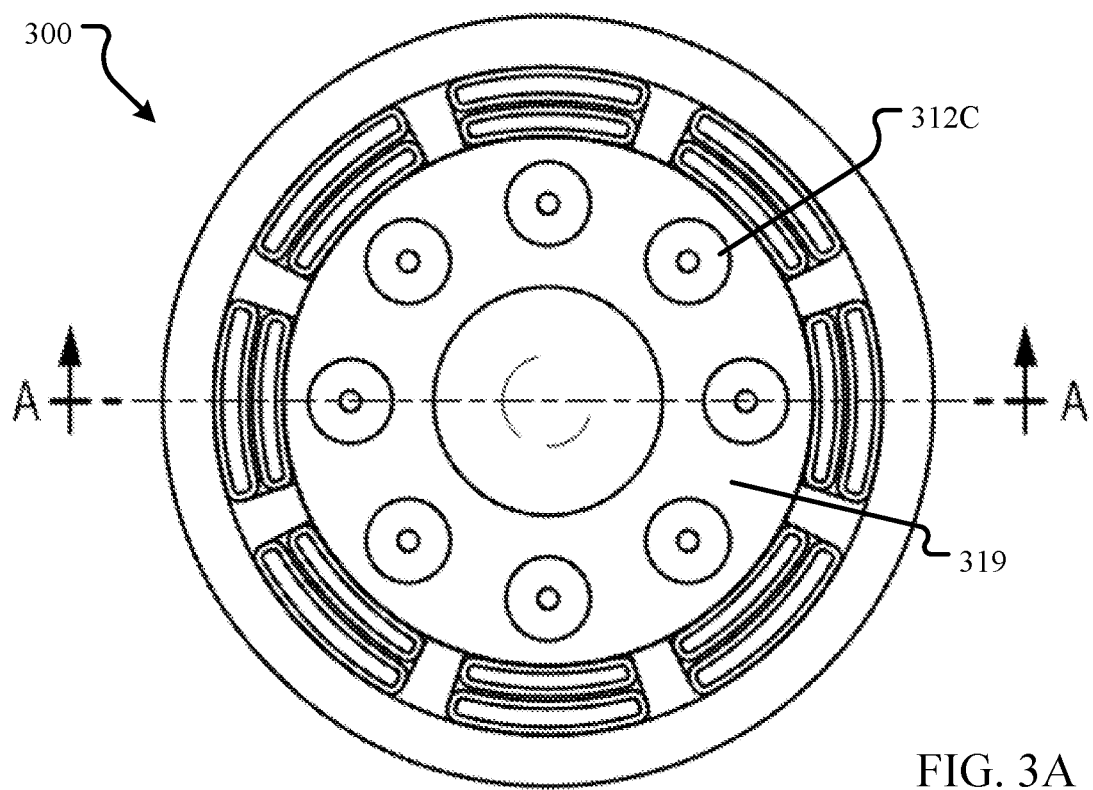
FIGS. 3A-3C illustrate an embodiment of a molten fuel reactor design that has a pump for each primary heat exchanger to drive fuel salt flow.
Figure 3B:
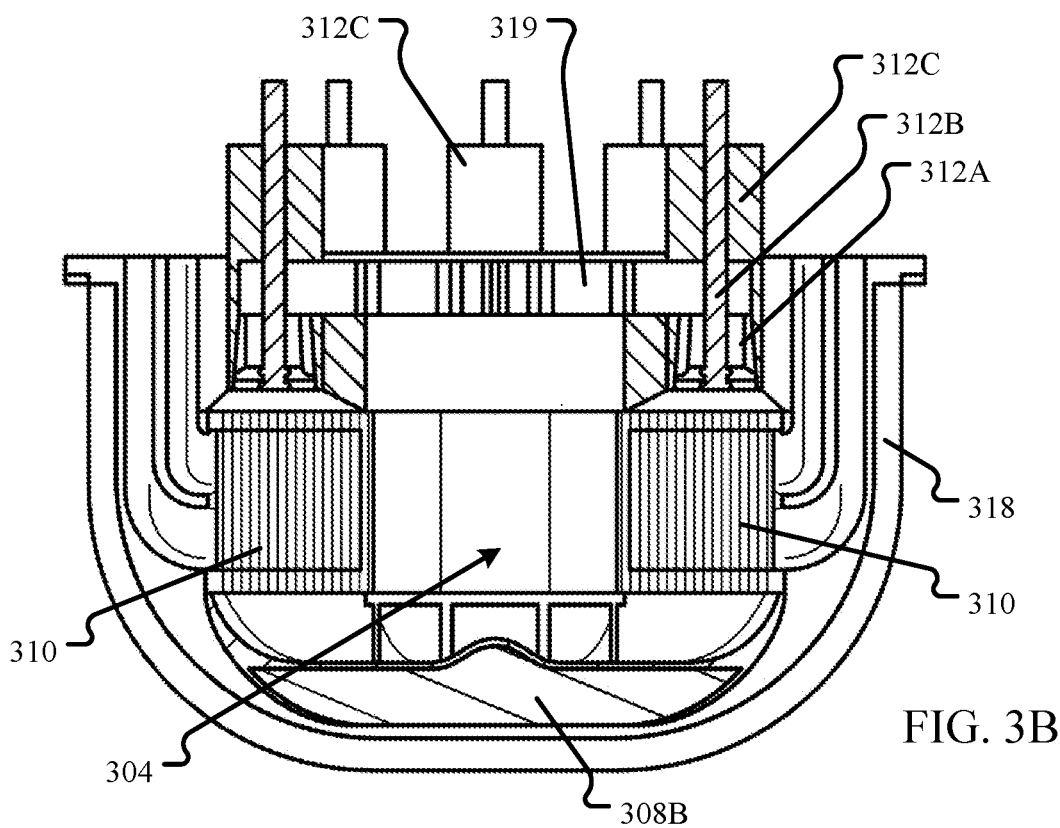
Figure 3C:
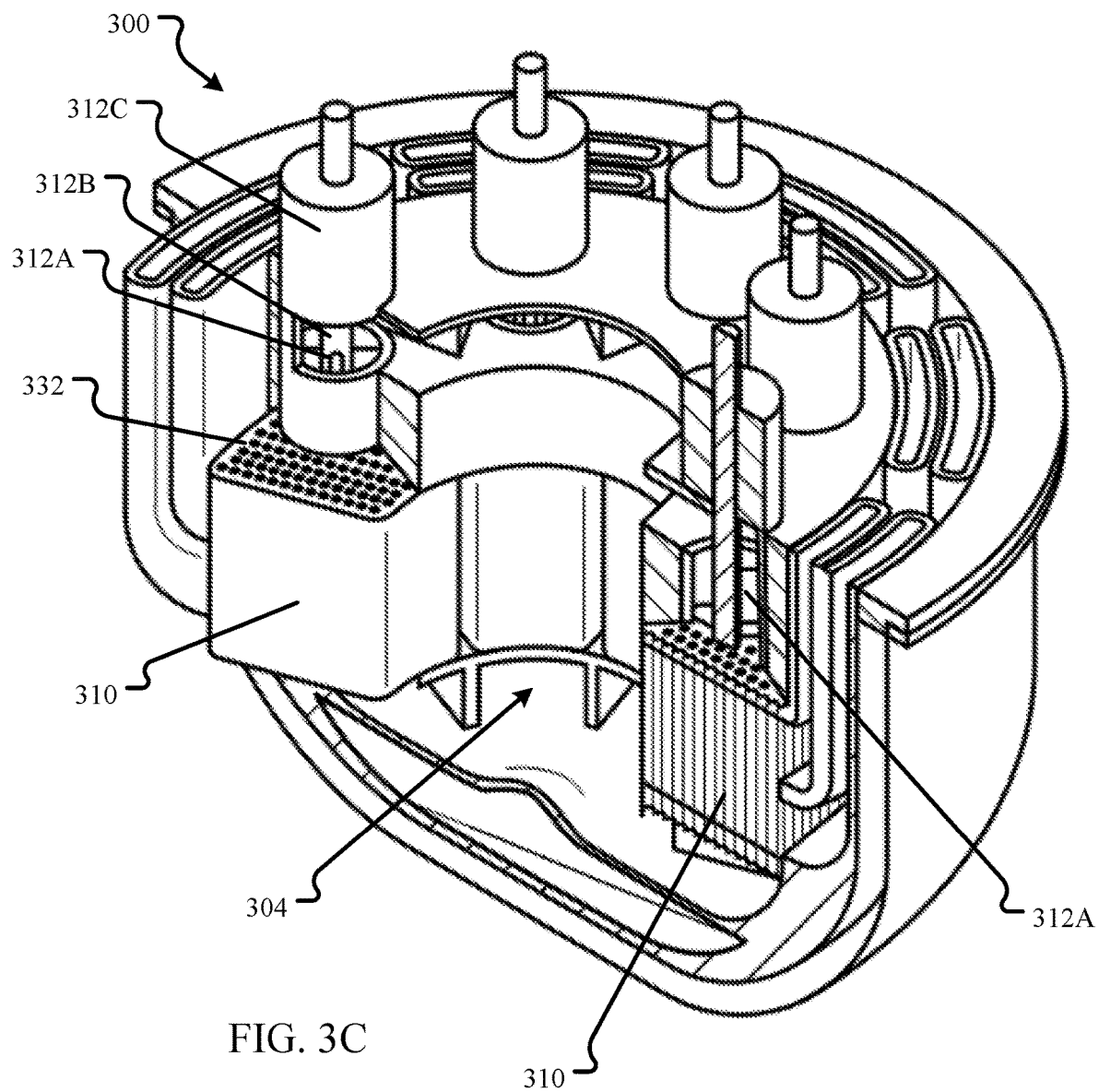

FIGS. 3A-3C illustrate an embodiment of a molten fuel reactor design that has a pump for each primary heat exchanger to drive fuel salt flow. In the embodiment shown, eight primary heat exchangers 310 are spaced around a central reactor core 304. FIG. 3A is a plan view looking down from the top of the reactor 300. FIG. 3B is a cross-sectional view through the center of the reactor 300 and two opposing heat exchangers 310. FIG. 3C illustrates a perspective view of an eight-exchanger configuration of a molten fuel reactor 300 partially cutaway to show different internal components including the impellers, shafts, and motors of the pumps.

The reactor core 304 is defined on top by a vessel head 319, which may be a reflector or incorporate a reflector, and on bottom by a neutron reflector 308B. Laterally, the reactor core 304 is defined by the shells of the eight heat exchangers 310. In operation, the heated fuel salt from the reactor core 304 is pumped through the heat exchangers where it is cooled and the cooled fuel salt returned to the core 304.

In the embodiment shown, the reactor core 304 and heat exchangers 310 are within a containment vessel 318. The primary containment vessel 318 is defined by a liner or set of liners that create an open-topped vessel. The cooled primary coolant enters and exits the vessel 318 from the top, which allows the containment vessel to be unitary and have no penetrations. The primary coolant loop is integrated into the reactor 300 so that the entering primary coolant first cools at least a portion of the containment vessel 318. After being routed next to an interior surface of the containment vessel 318 for some distance in a primary coolant inlet channel 330, in the embodiment shown the coolant is then routed into the bottom of the primary heat exchanger 310. The coolant exits the top of the primary heat exchanger 310 and is then routed out of the containment vessel 318 and to a power generation system (not shown).

In the embodiment shown fuel salt is driven through the fuel loop by eight separate impellers 312A located above the heat exchangers 310 in the upper channels. In the location of the impellers 312A, the sides of the channels serve as the casings or pump bodies shaped to complement the impellers 312A in order to obtain efficient flow. In the embodiment shown, the impellers 312A are between the upper tube sheet 332 of the heat exchangers and the horizontal portion of the channels from the top of the reactor core 304.

Each impeller 312A is connected by a rotating shaft 312B to a motor 312C located above the reactor 300. This removes the electronic components of the pump from the region of high neutron flux and high temperatures. One or more access ports may be provided in the vessel head 319 so that the impeller 312A may be removed and serviced or replaced.

The impellers 312A and shafts 312B may be made of any material suitable for the high temperature and neutron flux fuel salt environment that will exist in the fuel loop at the fuel inlet of the primary heat exchanger 310. For example, the fuel-facing components may be formed from one or more molybdenum alloys, one or more zirconium alloys (e.g., ZIRCALOY™), one or more niobium alloys, one or more nickel alloys (e.g., HASTELLOY™ N) or high temperature ferritic, martensitic, or stainless steel and the like. The impellers 312A and shafts 312B may be clad on the fuel salt-facing surfaces to protect against corrosion. Other protection options include protective coatings. In an embodiment, cladding may be molybdenum that is co-extruded with the base impeller or shaft material. Alternative cladding material includes molybdenum alloys, nickel and nickel alloys, and molybdenum-rhenium alloys.

Figure 4:
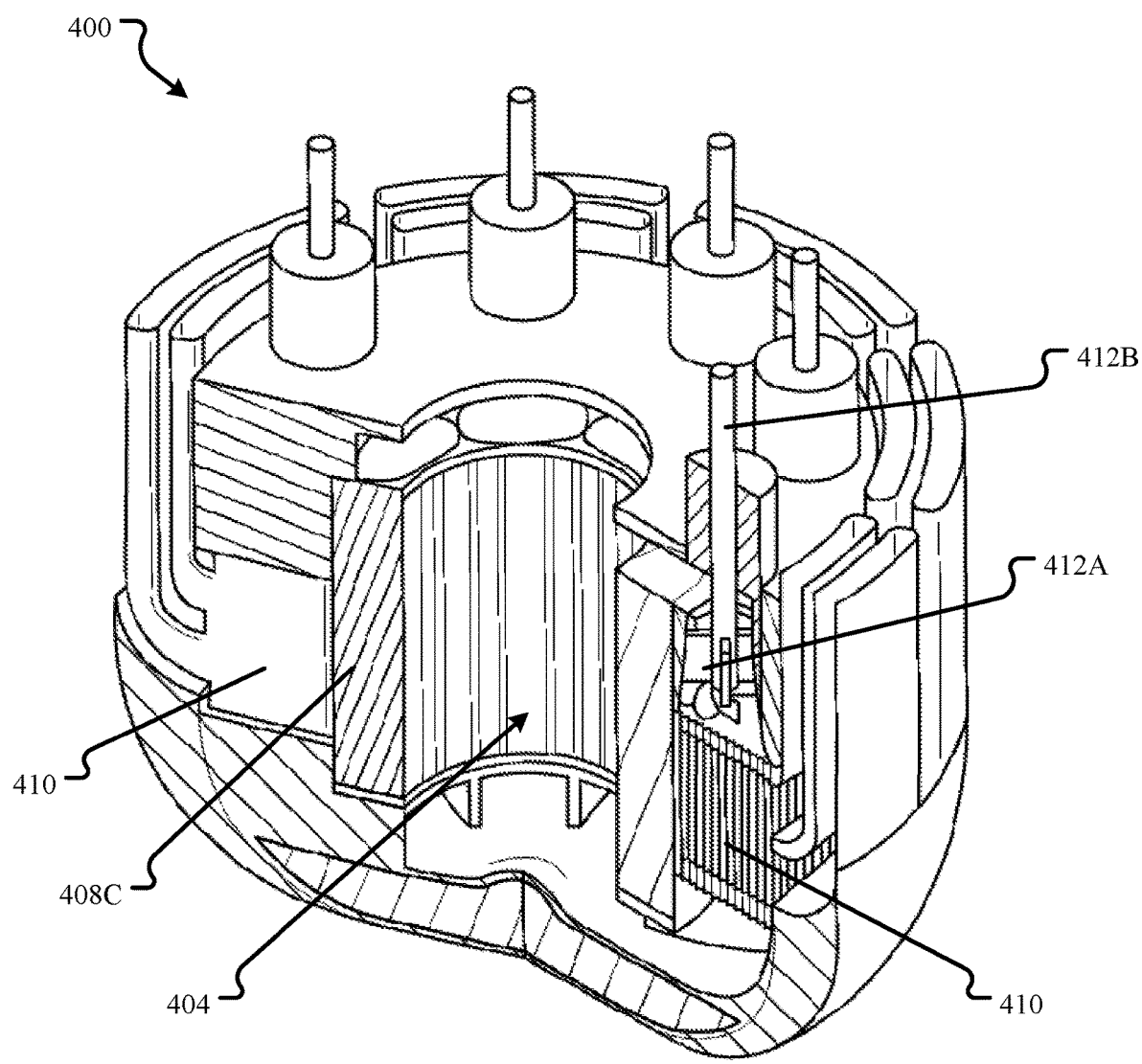
FIG. 4 illustrates an alternative embodiment of a molten fuel reactor design, similar to that of FIGS. 3A-3C but provided with an inner reflector.

FIG. 4 illustrates an alternative embodiment of a molten fuel reactor design, similar to that of FIGS. 3A-3C but provided with an inner reflector 408C. In the embodiment shown, the inner reflector 408C is provided separating the reactor core 404 from the heat exchangers 410. This reduces the neutron flux through the components of the heat exchangers as well as through the impellers 412A and shafts 412B. Otherwise, the reactor 400 is similar in operation and configuration to the reactor of FIGS. 3A-3C.

Figure 5:
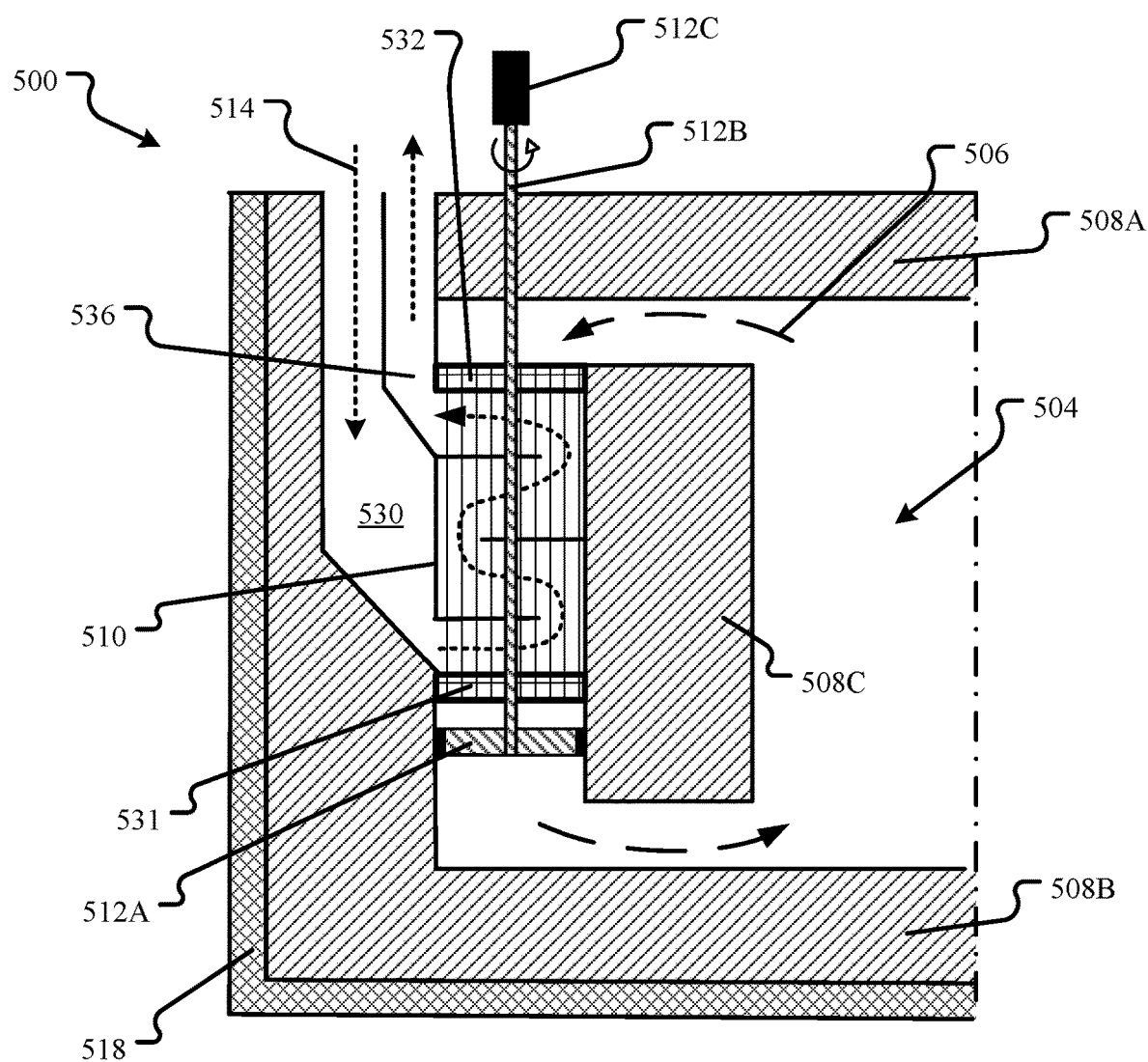
FIGS. 5, 6, and 7 illustrate embodiments of an alternative pump configuration in which the impeller is bottom mounted.
Figure 6:
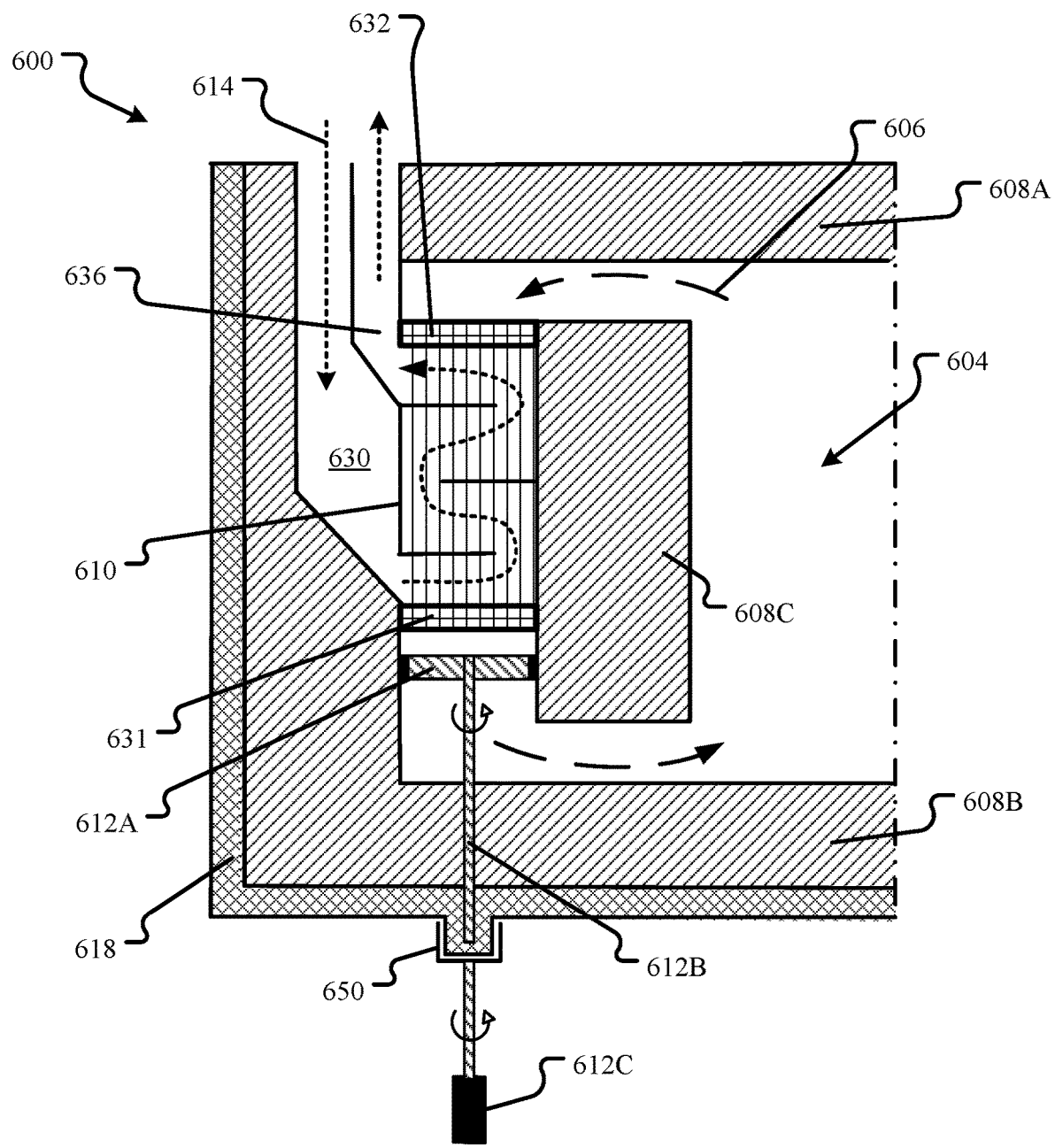
Figure 7:
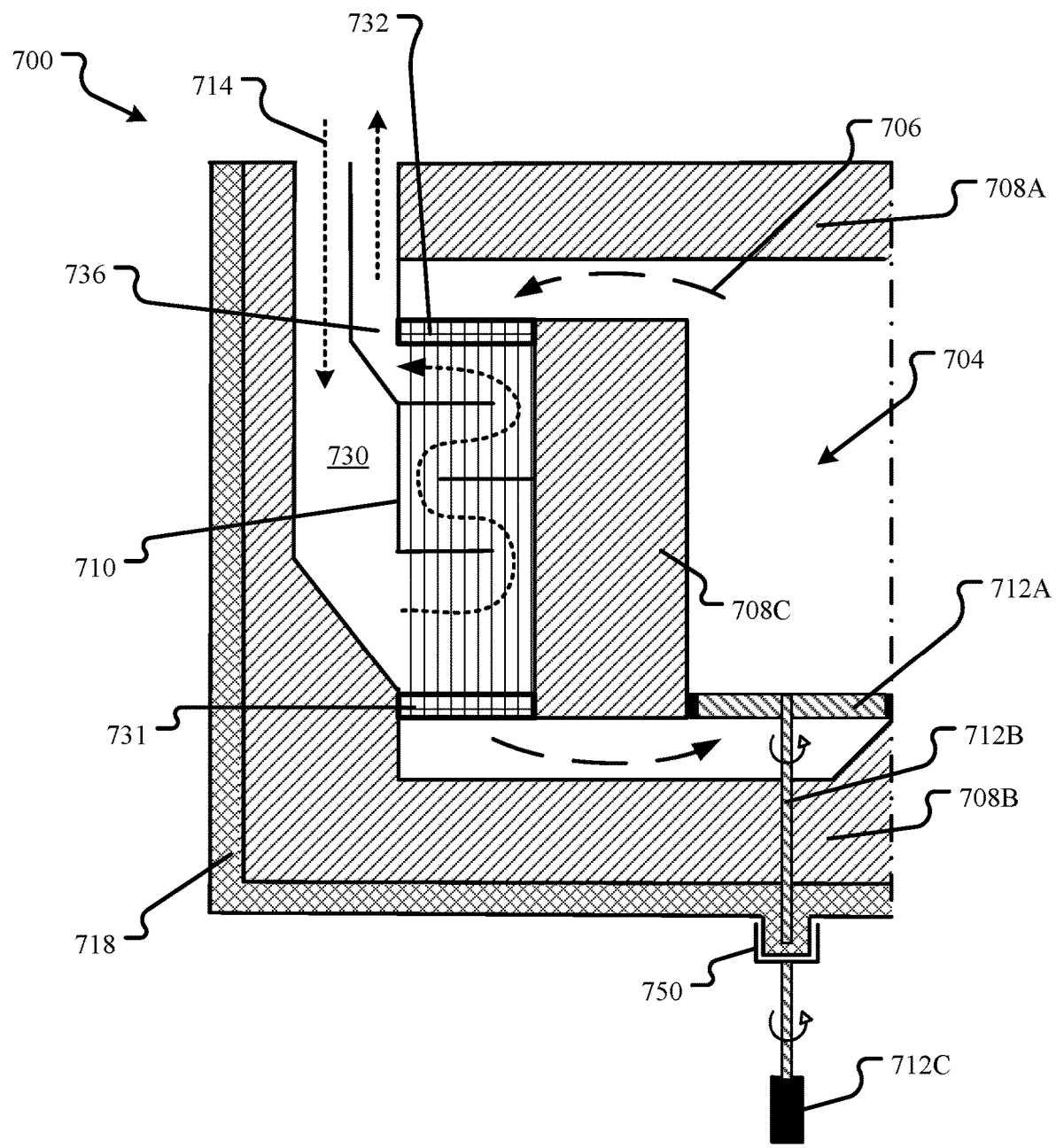

FIGS. 5, 6, and 7 illustrate embodiments of an alternative pump configuration in which the impeller is bottom mounted. In a bottom-mounted impeller configuration, the impeller is located in the fuel loop in the cooled fuel salt outlet channel below the primary heat exchanger, in which the outlet channel acts as the casing or body for the impeller. In this configuration, the impeller is in a lower temperature environment than in a top-mounted configuration as shown in the FIGS. 3A-3C and 4, above. Depending on the embodiment, the reduced wear on the impeller and portion of the shaft immediately adjacent the impeller may justify the additional complexity in overall design.

FIG. 5 illustrates a reactor 500 having a reactor core 504 defined by an upper reflector 508A, a lower reflector 508B and an inner reflector 508C. In the embodiment shown, the lower reflector 508B extends laterally and up the sides of the containment vessel 518 for added protection. The primary heat exchanger 510 configured to have shell-side coolant flow (illustrated by dotted lines 514), the coolant entering through a coolant inlet channel 530 and heated coolant exiting from coolant outlet channel 536. In the embodiment shown, fuel flows (illustrated by dashed lines 506) from the reactor core 504, through an upper channel above the inner reflector 508C, and into the heat exchanger 510 through the inlet tube sheet 532. After passing through the tube set, the now-cooled fuel exits the lower tube sheet 531 and flows back into the reactor core 504 via a lower channel under the inner reflector 508C.

In FIG. 5, the fuel-flow impeller 512A is located below the fuel salt outlet of the primary heat exchanger 510 configured to have shell-side coolant flow. The impeller 512A is attached to a shaft 512B connected to a top-mounted motor 512C above the vessel head (not shown) and the upper reflector 508A. In this embodiment, the shaft 512B passes through the heat exchanger 510. This may increase the complexity of the heat exchanger 510. In an embodiment, the impeller 512A and shaft 512B are integrated into the heat exchanger 510 whereby servicing is achieved by removing the heat exchanger/impeller and shaft assembly as a unit. In an alternative embodiment (not shown), the shaft 512B may not penetrate heat exchanger, but rather be located so that it is adjacent to but outside of the heat exchanger 510.

FIG. 6 illustrates a reactor 600 similar to that in FIG. 5. In the embodiment shown, the reactor 600 has a reactor core 604 defined by an upper reflector 608A, a lower reflector 608B and an inner reflector 608C. Again, the lower reflector 608B extends laterally and up the sides of the containment vessel 618 for added protection. The primary heat exchanger 610 configured to have shell-side coolant flow (illustrated by dotted lines 614), the coolant entering through a coolant inlet channel 630 and heated coolant exiting from coolant outlet channel 636. In the embodiment shown, fuel flows (illustrated by dashed lines 606) from the reactor core 604, through an upper channel above the inner reflector 608C, and into the heat exchanger 610 through the inlet tube sheet 632. After passing through the tube set, the now-cooled fuel exits the lower tube sheet 631 and flows back into the reactor core 604 via a lower channel under the inner reflector 608C.

In FIG. 6, the impeller 612A is still located below the fuel salt outlet channel below the primary heat exchanger 610 and attached to a shaft 612B. However, in FIG. 6, the shaft 612B extends downward and is coupled to a bottom-mounted motor 612C located outside of the containment vessel 618 by an electro-magnetic coupler 650. In this embodiment, the shaft 612B does not penetrate the containment vessel 618. This may increase the complexity of the containment vessel's construction but maintains the containment vessel 618 as a unitary vessel.

FIG. 7 illustrates a reactor 700 similar to that in FIG. 5. In the embodiment shown, the reactor 700 has a reactor core 704 defined by an upper reflector 708A, a lower reflector 708B and an inner reflector 708C. Again, the lower reflector 708B extends laterally and up the sides of the containment vessel 718 for added protection. The primary heat exchanger 710 configured to have shell-side coolant flow (illustrated by dotted lines 714), the coolant entering through a coolant inlet channel 730 and heated coolant exiting from coolant outlet channel 736. In the embodiment shown, fuel flows (illustrated by dashed lines 706) from the reactor core 704, through an upper channel above the inner reflector 708C, and into the heat exchanger 710 through the inlet tube sheet 732. After passing through the tube set, the now-cooled fuel exits the lower tube sheet 731 and flows back into the reactor core 704 via a lower channel under the inner reflector 708C.

In FIG. 7, the impellers 712A are located in the reactor core 704. In this embodiment, each cooled fuel salt channel is provided with an impeller 712A located near the bottom of the reactor core 704. As with FIG. 6, the impellers 712A have shafts 712B that extend downward and are coupled to bottom-mounted motors 712C located outside of the containment vessel 718 by electro-magnetic couplers 750. In this embodiment, the shafts 712B do not penetrate the containment vessel 718.

In an alternative embodiment, instead of a separate and independent pump for each primary heat exchanger, fewer or more pumps may be provided. For example, in an alternative embodiment of the reactor 700 of FIG. 7, a single impeller 718A may be provided at the bottom of the reactor core 704 that draws flow from the cooled fuel outlet of two or more of the heat exchangers 710.

Figure 8:
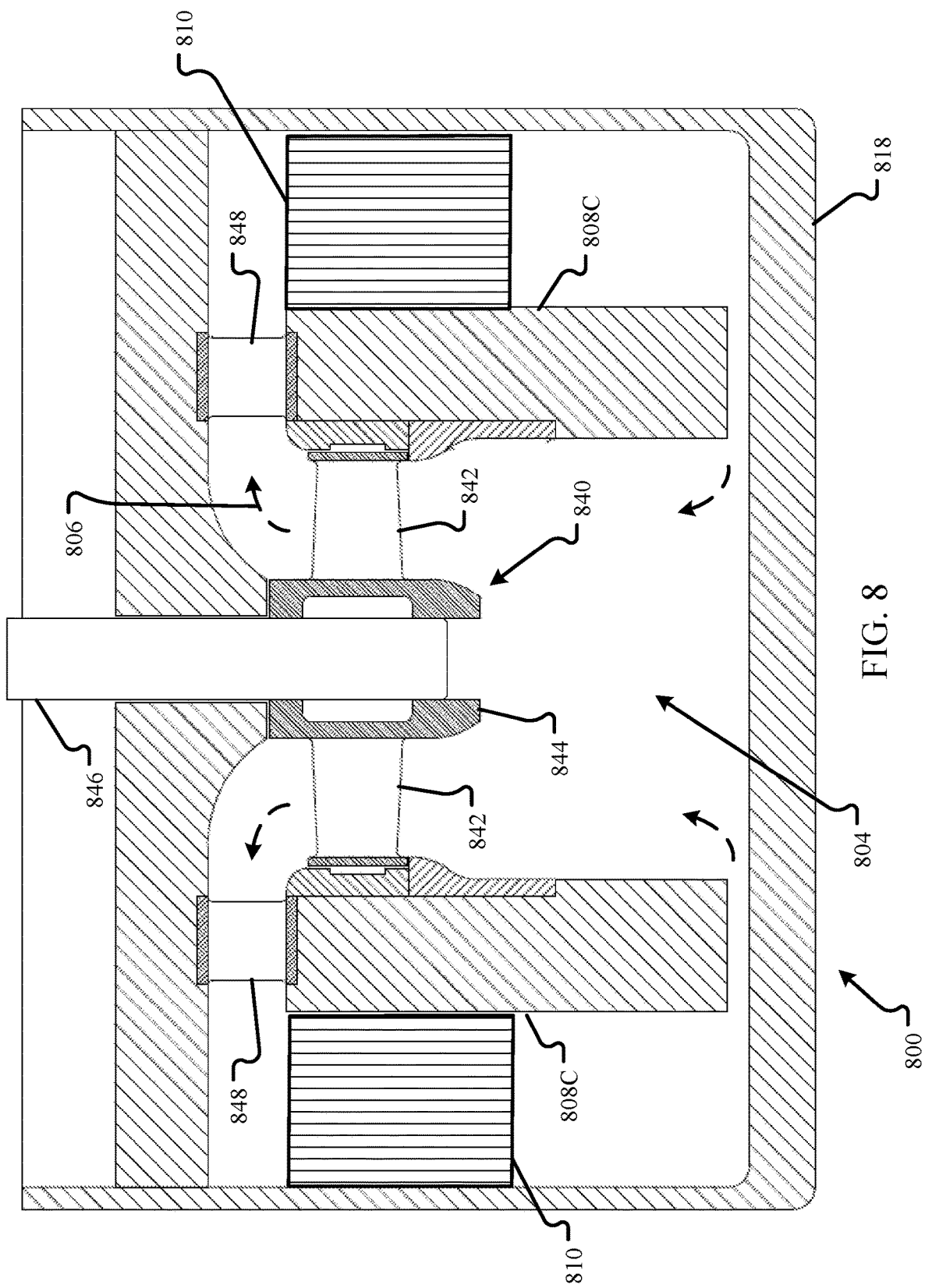
FIG. 8 illustrates yet another embodiment of a pump configuration in which a single impeller 812A is located within the reactor core 804.

FIG. 8 illustrates yet another embodiment of a pump configuration in which a single impeller 812A is located within the reactor core 804. In the embodiment shown, a single impeller 840 is rotated about the central axis of the reactor 800. In the embodiment shown, the impeller 840 includes a number of blades 842, a hub 844 from which the blades 842 extend laterally, and a shaft 812B coupled to the hub 844. Upon rotation of the shaft 812B, the hub and blades also rotate and drive the circulation of the fuel salt within the reactor 800 as shown by arrows 806. In the embodiment shown, the blades 842 extend from the hub 844 to a point adjacent to the side of the reactor core, in this case defined the internal reflectors 808C. In the embodiment shown, the side of the reactor core is provided with a complementary casing surface for the ends of the blades 842 in order to more efficiently drive the flow of the molten fuel through the reactor core 804.

One or more diffusers 848 may be provided in each of the upper channels to make the flow of salt more uniform as it circulates into the heat exchanger 810. The diffusers may be as simple as a flow directing baffle somewhere within the fuel loop or may be a more complicated set of baffles, orifice plates or other static elements.

In an alternative embodiment (not shown), the impeller is bottom mounted as discussed with reference to FIGS. 6 and 7 and the shaft 846 extends down from the hub, rather than upward, and is rotated by an electromagnetic coupling below the reactor containment vessel 818.

Figure 9:
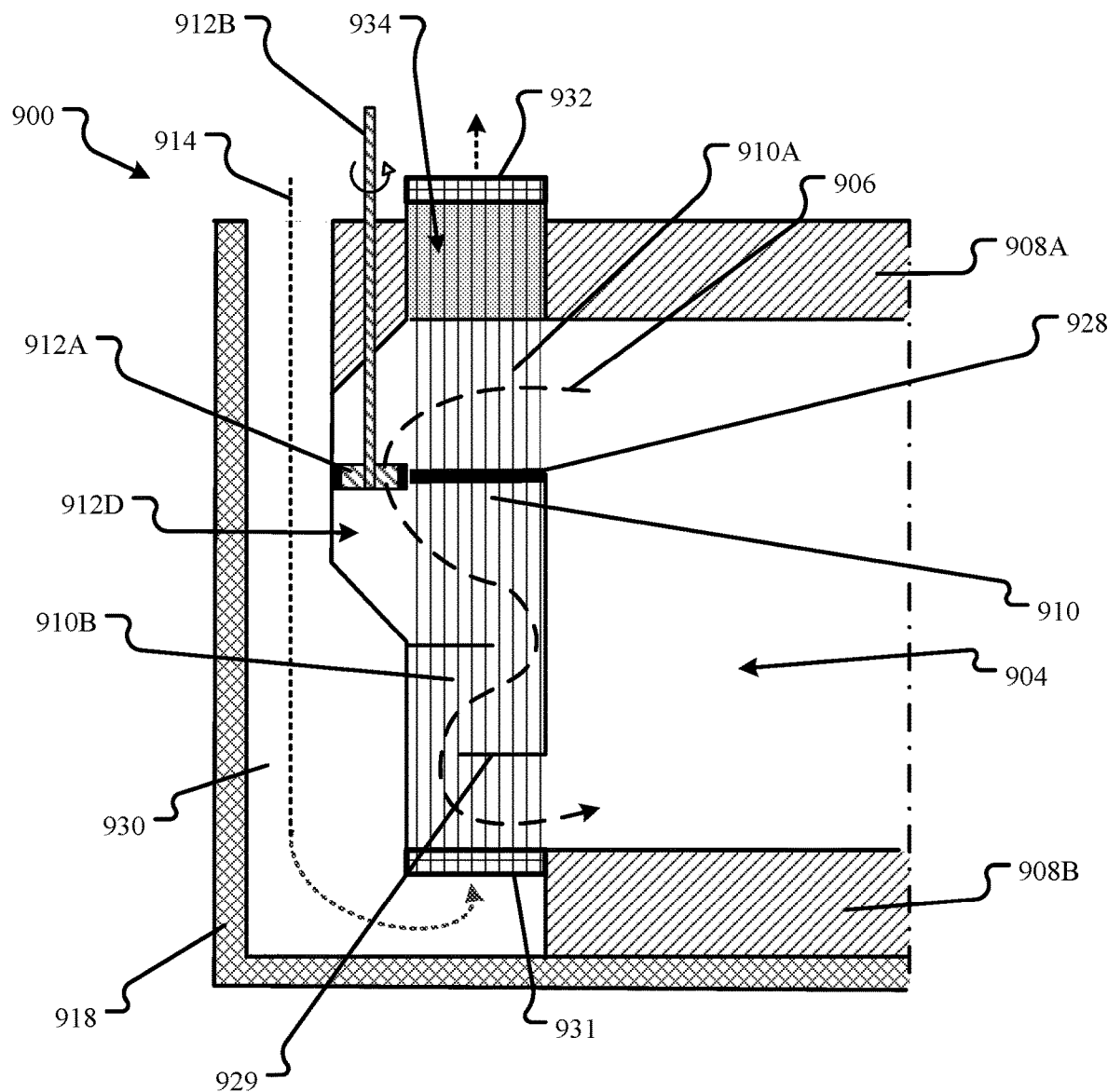
FIG. 9 illustrates yet another pump configuration in which the impeller is intermediately located between two sections of a primary heat exchanger.

FIG. 9 illustrates yet another pump configuration in which the impeller is intermediately located between two sections of a primary heat exchanger. In the embodiment shown, a reactor 900 is provided having an upper reflector 908A, a lower reflector 908B and one or more heat exchangers 910 enclosing a reactor core 904, all contained within a containment vessel 918. An inner reflector (not shown) may or may not be provided, depending on the embodiment, between the reactor core 904 and the heat exchanger 910, between the heat exchanger 910 and the coolant inlet channel 930 or both. In the embodiment shown, fuel salt is circulated through the shell of the heat exchanger 910, as illustrated by dashed line 906, and coolant is passed through the tubes of the tube set, as illustrated by dotted line 914.

The heat exchanger 910 is divided into two sections 910A and 910B by an intermediate wall 928. The tube set is continuous throughout and extends from a lower tube sheet 931, which is the coolant inlet, to the upper tube sheet 932, which is the coolant outlet. In the embodiment shown, heated fuel salt flows past the tube set in the upper section 910A of the heat exchanger 910, which is open to the reactor core 904. At least a portion of the opposite side of the shell is also open allowing the fuel salt to flow into a pump channel 912D containing an impeller 912A.

The impeller 912A is connected via a shaft 912B to a motor (not shown) as described above). Rotation of the impeller 912A drives the fuel salt into the lower section 910B heat exchanger shell, through the tube set, and out the bottom of the shell through another opening into the reactor core 904. One or more baffles 929 may also be provided to route the flow of fuel salt through the tubeset.

FIG. 9 illustrates a region 934 within the shell of the heat exchanger 910 that is above the level of fuel salt in the reactor core 904. This region may either be solid except for the penetrating tubes, for example filled with a reflector material, or may be a headspace filled with inert gas.

In the embodiment shown in FIG. 9, the impeller 912A is within the heat exchanger, that is, within the shell of the heat exchanger 910. It is located away from the area of high neutron flux and also not exposed to the highest temperatures of the reactor 900. The impeller 912A and shaft 912B may be integrated into the heat exchanger 910 so that all are removed as an assembly for servicing or replacement. In an alternative embodiment using a different heat exchanger design, the heat exchanger may be similarly adapted to include an impeller or impellers within the heat exchanger. For example, in a plate and frame heat exchanger an impeller may be located within a corner port of the inter plate transfer path or, alternatively, a plate within the stack of heat exchanging plates could be provided with an impeller.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. For example, electromagnetic couplers could be used with top-mounted motors to reduce the number of penetrations of the vessel head, in which case the shafts need not penetrate the vessel head, for instance, as shown in FIGS. 3A-C. Numerous other changes may be made which will readily suggest themselves to those skilled in the art and which are encompassed in the spirit of the disclosure.

What is claimed is:

1. A molten fuel nuclear reactor comprising:
a containment vessel and vessel head;
a reactor core enclosed within the containment vessel and vessel head, the reactor core having an upper region and a lower region;
a heat exchanger enclosed within the containment vessel and vessel head, the heat exchanger fluidly connected to the upper region of the reactor core by an upper channel and fluidly connected to the lower region of the reactor core by a lower channel, the reactor core, heat exchanger and upper and lower channels forming a fuel loop;
a reflector defining the lateral extent of the reactor core, the reflector adjacent to the heat exchanger and separating the reactor core from the heat exchanger, wherein the upper channel is above the reflector and the lower channel is below the reflector; and
an impeller enclosed within the containment vessel and vessel head, the impeller attached to a shaft that is rotatable by a motor located outside of the containment vessel and vessel head;
wherein the impeller is located within the fuel loop such that the impeller, when rotated by the motor, circulates fluid through the fuel loop;
wherein the reflector has a top defined by the upper channel and a bottom defined by the lower channel and the impeller is located below the top of the reflector and above the heat exchanger.

2. The molten fuel nuclear reactor of claim 1, wherein the shaft penetrates the vessel head and rotatably connects the impeller to a motor located above the vessel head.

3. The molten fuel nuclear reactor of claim 1, wherein the impeller is located in the upper channel.

4. The molten fuel nuclear reactor of claim 1, wherein the heat exchanger is one of a plurality of independent heat exchangers enclosed within the containment vessel and vessel head.

5. The molten fuel nuclear reactor of claim 4, wherein each independent heat exchanger in the plurality is provided with an impeller.

6. The molten fuel nuclear reactor of claim 1, wherein the heat exchanger is selected from a shell and tube heat exchanger, a plate heat exchanger, a plate and shell heat exchanger, a printed circuit heat exchanger, and a plate fin heat exchanger.

7. The molten fuel nuclear reactor of claim 6, wherein the heat exchanger is a shell and tube heat exchanger having a plurality of tubes within a shell in which the fluid circulating through the fuel loop passes through the plurality of tubes and a coolant passes through the shell.

8. The molten fuel nuclear reactor of claim 1, wherein the heat exchanger is located below the impeller and above the bottom of the reflector.

9. The molten fuel nuclear reactor of claim 1, wherein the heat exchanger has a coolant inlet opposite the reflector and a coolant outlet opposite the reflector.

10. The molten fuel nuclear reactor of claim 1, wherein the reflector is adjacent to the impeller and separates the reactor core from the impeller.

11. A molten fuel nuclear reactor comprising:
a containment vessel and vessel head;
a reactor core enclosed within the containment vessel and vessel head, the reactor core having an upper region and a lower region;
a heat exchanger enclosed within the containment vessel and vessel head, the heat exchanger fluidly connected to the upper region of the reactor core by an upper channel and fluidly connected to the lower region of the reactor core by a lower channel, the reactor core, heat exchanger and upper and lower channels forming a fuel loop;
a reflector defining the lateral extent of the reactor core, the reflector adjacent to the heat exchanger and separating the reactor core from the heat exchanger, wherein the upper channel is above the reflector and the lower channel is below the reflector; and
an impeller enclosed within the containment vessel and vessel head, the impeller attached to a shaft that is rotatable by a motor located outside of the containment vessel and vessel head;
wherein the impeller is located within the fuel loop such that the impeller, when rotated by the motor, circulates fluid through the fuel loop;
wherein the reflector has a top defined by the upper channel and a bottom defined by the lower channel and the impeller is located below the top of the reflector and above the heat exchanger and the heat exchanger is located below the impeller and above the bottom of the reflector.

12. The molten fuel nuclear reactor of claim 11, wherein the shaft penetrates the vessel head and rotatably connects the impeller to a motor located above the vessel head.

13. The molten fuel nuclear reactor of claim 11, wherein the impeller is located in the upper channel.

14. The molten fuel nuclear reactor of claim 11, wherein the heat exchanger is one of a plurality of independent heat exchangers enclosed within the containment vessel and vessel head.

15. The molten fuel nuclear reactor of claim 11, wherein the heat exchanger is selected from a shell and tube heat exchanger, a plate heat exchanger, a plate and shell heat exchanger, a printed circuit heat exchanger, and a plate fin heat exchanger.

16. The molten fuel nuclear reactor of claim 15, wherein the heat exchanger is a shell and tube heat exchanger having a plurality of tubes within a shell in which the fluid circulating through the fuel loop passes through the plurality of tubes and a coolant passes through the shell.

17. The molten fuel nuclear reactor of claim 11, wherein the heat exchanger has a coolant inlet opposite the reflector and a coolant outlet opposite the reflector.

18. The molten fuel nuclear reactor of claim 11, wherein the reflector is adjacent to the impeller and separates the reactor core from the impeller.

* * * * *